STRIP TRANSMISSION LINE MODULATOR

Filed May 13, 1960

INVENTORS
CHARLES R. AMMERMAN
HOWARD SCHNEIDER
BY JAMES T. OBLINGER
Mitchell & Bechert
ATTORNEYS United States Patent Office 3,111,634
Patented Nov. 19, 1963

3,111,634

STRIP TRANSMISSION LINE MODULATOR

Charles R. Ammerman, State College, Howard L. Schneider, Pittsburgh, and James T. Oblinger, State College, Pa., assignors to HRB-Singer, Inc., State College, Pa., a corporation of Delaware Filed May 13, 1960, Ser. No. 29,071
6 Claims. (Cl. 332—52)

This invention relates to a receiver for electromagnetic radiation, and more particularly to a modulator in such receiver for amplitude-modulating the received radiations.

More specifically, the invention relates to a modulator in a receiver of the surveillance type, which receiver is utilized to receive radiations of the continuous wave (CW) type frequency modulation (FM) type and phase modulation (PM) type over a broad frequency spectrum. The invention is directed to a modulator for amplitude modulating, or pulse modulating, the CW so that a crystal detector may be employed. As is well known, a crystal detector can detect only amplitude or pulse modulations.

The presence of electromagnetic radiations can be ascertained by a number of techniques. For example, a CW signal, modulated or unmodulated, can be converted to an audible signal by means of an oscillator, such as a beat frequency oscillator, which is tuned sufficiently close to the CW frequency to cause an audible beat tone. Modulated carriers can also be received by employing appropriate demodulating devices, such as a diode, a triode and a crystal detector for amplitude-modulated (AM) signals, and a discriminator or slope detector for frequency-modulated (FM) signals.

In general, since tuned resonance circuits are used, these techniques can (without tuning) determine the presence of a signal only over a rather narrow frequency range. Of course, the resonance frequency of the circuits can be tuned over a wide band of frequencies, and if provision is made for switching to a number of bands, several octaves may be covered. Nevertheless, only a small portion of the spectrum can be observed at one time. Furthermore, the physical size and power requirement of such receivers (usually superheterodyne) are relatively large and contain rather complex circuitry.

Another technique for determining the presence of a signal is the crystal video receiver. Since it is inherently a broad bandwidth receiver, it can receive a signal anywhere within its bandwidth without the necessity of tuning. The received signal is demodulated by means of a crystal diode. As indicated previously, a diode can only demodulate an AM signal. It can, therefore, determine the presence of a signal with a varying amplitude even though the envelope of this amplitude variation may not correspond with the original modulating signal. Thus, for example, it can ascertain the presence of a pulsed carrier since this is an extreme form of AM. It is because of its relative simplicity that the crystal video receiver can be made small and compact. The major shortcoming, however, of the crystal video receiver is that it cannot detect pure CW or FM signals since such signals have no amplitude variation.

Accordingly, it is an object of the invention to provide in a receiver of the crystal video type, a modulator small in size, light in weight and self-contained, which is capable of modulating CW or FM waves so that the modulated wave may be detected by the diode.

It is a feature of the invention to provide such a modulator which in no way interferes with or reduces the operating capability of the original crystal video receiver.

It is a further object of the invention to provide a device which is adaptable as a broad band, variable attenuator or as an instantaneous or standard automatic gain control circuit.

In accordance with an aspect of the invention, the novel modulator comprises a transmission line preferably, although not necessarily, of the strip line type. The energy resulting from the radiations is interrupted periodically by effectively short circuiting the transmission line. If the strip transmission line is utilized, the short circuiting is effected by conducting current between the outer and inner conductors at periodic intervals. The modulated CW energy is conducted over the transmission line to a diode detector, where the pulsed CW wave is detected. A filter is provided on the transmission line for passing only energy at the CW frequency and blocking energy at the frequency of the periodic interval, whereby in the absence of CW energy, the filter means blocks the short circuiting current from the output of the transmission line.

The above-mentioned and other features and objects of this invention and the manner of attaining them will become more apparent and the invention itself will be best understood by reference to the following description of an embodiment of the invention taken in conjunction with the accompanying drawing, wherein.

Figure 1:
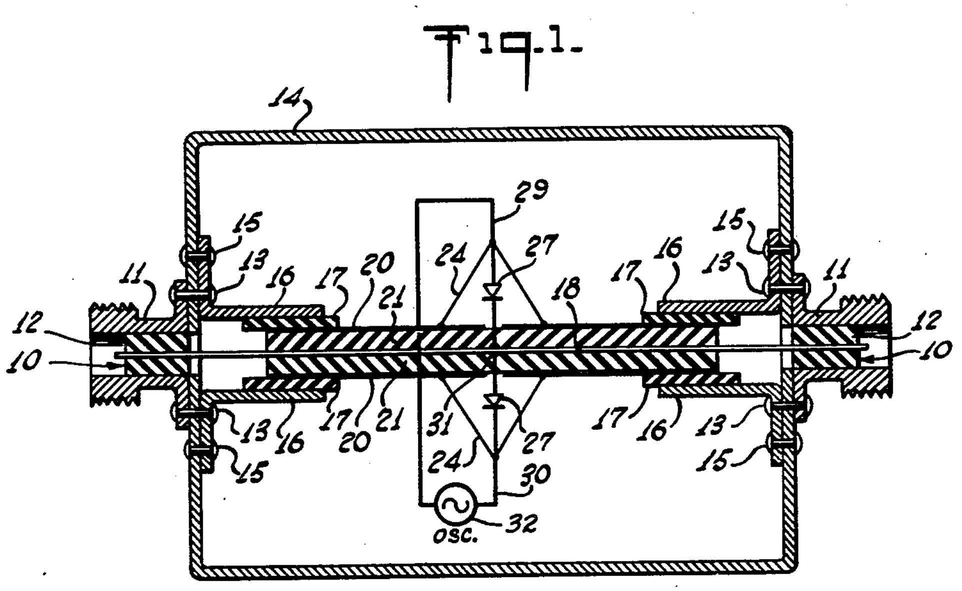
FIG. 1 is a cross sectional view of one embodiment of the novel modulator.

Referring now to FIG. 1, two standard (type N) coaxial connectors 10 are mounted at either end of housing 14 made of a metal, such as aluminum, having a high conductivity. The housing 14 is sufficiently rigid to sustain the mechanical stress caused by parts contained within the housing, and to form a base on which interior parts are mounted.

Supporting brackets 16, preferably made of silver-plated copper, are mounted to the interior of the housing 14 at the opposite ends thereof and opposite the connectors 10. These brackets 16 may be mounted using the same mounting screws or rivets 13 employed to mount the connectors. If additional support is required, screws or rivets 15 may be utilized, as shown. The brackets 16 must have sufficient rigidity to hold the strip transmission line and its associated parts firmly in place.

The strip transmission line is composed of metallic-strip (preferably copper) central or inner conductor 18 connected at each end to the inner conductor of the type N coaxial connectors 10. This relatively narrow central conductor 18 is bonded to one of two sheets 21 of low loss dielectric, such as Teflon impregnated glass fiber. A metallic ground plate 20 (preferably silver plated copper) is bonded on the exterior surface of each of the dielectric sheets 21. By making the ground plates 20 sufficiently wide with respect to the central conductor 18, radiation from the sides of the strip transmission line is minimized.

In accordance with the first embodiment of the invention, the strip transmission line is supported between the brackets 16, but is insulated therefrom by mica spacers 17. The mica spacers form a capacitor with the brackets and ground plates, the thickness of the mica being selected so that the capacitance passes the RF energy. The result is that the metallic ground plates 20 become false grounds. In other words, the ground plates 20, being capacitively coupled to the support brackets 16, form radio frequency RF ground plates.

The received CW energy is pulse modulated by changing the dynamic impedance of the transmission line. This impedance is altered by changing the voltage applied to a pair of crystal diodes 27, connected respectively from one outer conductor to the inner conductor, and from the inner conductor to the other outer conductor. The diodes are connected in series so that their center or common junction 31 is connected to the central conductor 18 at point 31. The copper-clad dielectric sheets 21 are drilled to permit the diodes 27 to extend perpendicularly therethrough. The outer ends of the diodes 27 are enclosed in copper shields 24 which are soldered to the ground plates 20. The outer or external leads 29 and 30 of the diodes 27 are electrically connected to their respective diode shields 24. The impedance modifying voltage which causes the diodes to conduct is generated by an oscillator or multivibrator 32 and applied to the diodes through the diode leads 29 and 30.

In operation, when the diodes 27 are not conducting, the impedance of the strip transmission line is not appreciably affected since the line is shunted by a relatively high impedance. However, when the diodes 27 are conducting, the line is effectively short-circuited and the RF signal on the strip transmission line is attenuated and reflected.

If the oscillator 32 is an astable multivibrator, then the device becomes a chopper, alternately passing and attenuating the RF signal. The RF signal is in effect modulated with a square wave. This means that, if the RF signal is either CW or FM, it will cause the crystal video receiver to produce an output. By proper design an audible tone may be produced which corresponds to the frequency of the multivibrator.

On the other hand, if there is no RF signal present, then no audible tone is produced. The modulating signal from the multivibrator does not appear at the output from the detector because of the high impedance (at the modulating frequency) of the coupling capacity formed by 16, 17 and 20.

Figure 2:
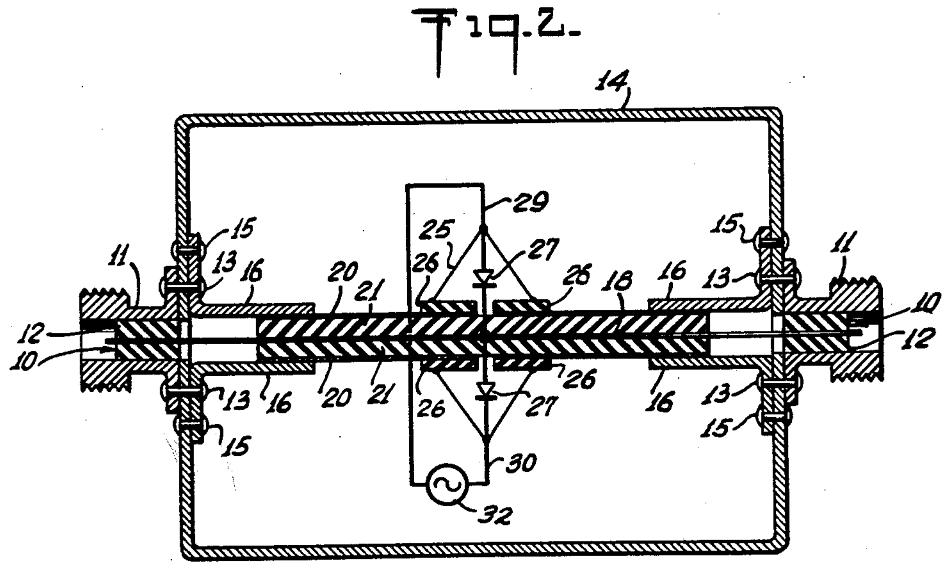
FIG. 2 is a partial cross sectional view of an alternative embodiment of the modulator.

An alternate embodiment of the invention is shown in FIG. 2. In this arrangement the capacitive coupling (16, 17 and 20) has been shifted to the exterior ends 29 and 30 of the diodes 27; that is, the mica spacers 17 and the copper shields 24 are replaced by mica spacers 26 and copper shields 25. The result of this change is that the ground plates are true ground planes and the exterior ends 29 and 30 and their respective copper shields 25 are capacitively coupled to the ground plates. As before, the impedance modifying voltage is applied to the diodes through the diode leads 29 and 30.

The advantage of the second embodiment is that the physical construction is simplified and can be made more rigid. Furthermore, the device can be constructed, if desired, of a coaxial section, since the ground plates are at the same D.C. potential.

The particular advantages of the novel modulator are its small size, its low bias power requirements needed to vary the amount of attenuation, and its ability to prevent any output on the RF circuit (due to the modulation signal) when there is no RF signal present. This latter characteristic is fundamental to the device and is accomplished by using the described capacitive coupling to block the modulating signal from the RF circuit. The diode-line attenuator can be designed to operate over an extremely broad frequency spectrum since the device depends only upon the characteristics of a strip transmission line operated in the TEM mode.

While the foregoing description sets forth the principles of the invention in connection with specific apparatus, it is to be clearly understood that this description is made only by way of example and not as a limitation of the scope of the invention as set forth in the objects thereof and in the accompanying claims.

We claim:

1. A modulator for amplitude modulating electromagnetic energy of the continuous wave type, comprising a transmission line for said energy of the strip line type, said transmission line comprising an inner conductor and a pair of planar-shaped outer conductors on opposite sides of said inner conductor respectively, dielectric means separating said inner conductor from said planar conductors, a housing for said modulator, conductive supporting brackets secured to said housing and supporting said transmission line at the opposite ends thereof by being coupled to said opposite planar conductors, electrical connectors for applying energy to and conducting energy from said transmission line, comprising inner conductors connected to the opposite ends of said strip line inner conductor and outer conductors secured to the outsides of said housing and electrically connected to said brackets respectively, means coupled to said transmission line to short-circuit said transmission line by generating current between said inner and planar conductors at periodic intervals, and filtering means coupled to said transmission line to pass energy at the continuous wave frequency and block energy at the frequency of said periodic intervals, whereby in the absence of said continuous waves said filtering means blocks said shorting current from being conducted therethrough.

2. The modulator according to claim 1, wherein said current generating means comprises an oscillator and said means coupled to said transmission line comprises a pair of diodes serially coupled from one planar conductor to the inner conductor and from the inner conductor to the opposite planar conductor, and said diodes being connected to said oscillator.

3. The conductor according to claim 2, wherein said filtering means comprises capacitive means located between said brackets and said planar conductors.

4. The modulator according to claim 2, wherein said filtering means comprises capacitive means located between said planar conductors and said diodes.

5. A modulator for amplitude modulating electro-magnetic energy of the continuous wave type, comprising a transmission line for said energy, said transmission line being of the strip type and having an inner conductor and planar type conductors on opposite sides of said inner conductor with dielectric means separating said inner conductor from said planar conductors, a pair of diodes serially connected from one planar conductor to the inner conductor and from the inner conductor to the opposite planar conductor, means coupled to said transmission line for interrupting the continuous flow of said energy at a predetermined frequency, said interrupting means including an oscillator coupled in series with said serially connected diodes whereby the oscillator voltage is isolated from the inner conductor, and filtering means coupled to said transmission line to pass energy at the continuous wave frequency and block energy at said predetermined frequency.

6. A modulator for amplitude modulating electromagnetic energy of the continuous wave type comprising a transmission line for said energy including a first elongated conductor and a pair of conductors disposed in spaced relationship therewith and separated therefrom by dielectric means, a hollow circular connector provided at each of the opposite ends of said first conductor, said connectors surrounding said first conductor and being insulated therefrom, means coupled to said transmission line to short circuit said line by generating current between said first conductor and said pair of conductors at periodic intervals, said means coupled to said transmission line including a pair of diodes serially connected between a pair of terminals adapted to receive an alternating potential, the connection common to each of said diodes also being connected to said first conductor, and capacitor means between said terminals and said connectors, whereby said terminals are isolated from direct electrical connection with said connectors.

References Cited in the file of this patent

UNITED STATES PATENTS

| | | |
|---|---|---|
| 2,514,678 | Southworth | July 11, 1950 |
| 2,605,399 | Pound | July 29, 1952 |
| 2,783,378 | Vogeley | Feb. 26, 1957 |
| 2,859,417 | Arditi | Nov. 4, 1958 |
| 2,938,175 | Sommers et al. | May 24, 1960 |
| 2,962,669 | Mahler | Nov. 29, 1960 |
| 3,040,263 | Young | June 19, 1962 |